United States Patent
Pashley et al.

(10) Patent No.: US 6,783,269 B2
(45) Date of Patent: Aug. 31, 2004

(54) SIDE-EMITTING ROD FOR USE WITH AN LED-BASED LIGHT ENGINE

(75) Inventors: Michael D. Pashley, Cortlandt Manor, NY (US); Thomas M. Marshall, Hartsdale, NY (US); Frank J. P. Schuurmans, Valkenswaard (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/749,139

(22) Filed: Dec. 27, 2000

(65) Prior Publication Data

US 2002/0080623 A1 Jun. 27, 2002

(51) Int. Cl.[7] .................................................. F21V 7/04
(52) U.S. Cl. ........................ 362/555; 362/560; 362/582; 362/26
(58) Field of Search .............................. 362/555, 559, 362/560, 582, 26, 27, 511, 231; 385/43, 123, 146, 31, 109

(56) References Cited

U.S. PATENT DOCUMENTS

| 4,231,077 A | 10/1980 | Joyce et al. ............... 362/32 |
|---|---|---|
| 4,733,332 A | 3/1988 | Yamashita et al. ............ 362/32 |
| 4,885,663 A | 12/1989 | Parker .......................... 362/32 |
| 5,027,259 A | 6/1991 | Chujko ......................... 362/32 |
| 5,123,077 A * | 6/1992 | Endo et al. .................. 385/129 |
| 5,243,506 A | 9/1993 | Whitehead ................... 362/307 |
| 5,539,624 A | 7/1996 | Dougherty ................... 362/32 |
| 5,718,666 A | 2/1998 | Alarcon ....................... 600/249 |
| 5,810,463 A * | 9/1998 | Kawahara et al. ............ 362/31 |
| 5,848,831 A | 12/1998 | Tatsumi ....................... 362/102 |
| 5,921,670 A * | 7/1999 | Schumacher et al. ....... 362/480 |
| 6,031,958 A * | 2/2000 | McGaffigan ................ 362/555 |

FOREIGN PATENT DOCUMENTS

| WO | WO9004132 | 4/1990 | ............. F21V/8/00 |
|---|---|---|---|
| WO | WO9945316 | 9/1999 | ............. F21V/8/00 |

* cited by examiner

*Primary Examiner*—Sandra O'Shea
*Assistant Examiner*—Bertrand Zeade
(74) *Attorney, Agent, or Firm*—Aaron Waxler

(57) ABSTRACT

According to this invention, a side-emitting illumination device for uniformly distributing light is composed of an LED light source, a light-transmitting rod which permits total internal reflection, and outcoupling material affixed to an outer surface of the rod. Light enters the rod at one end and travels along the rod by total internal reflection. Light that hits the outcoupling material is angularly distributed based on the width of the outcoupling material.

19 Claims, 5 Drawing Sheets

SIDE-EMITTING ROD FOR USE WITH AN LED-BASED LIGHT ENGINE

BACKGROUND OF THE INVENTION

The invention relates to the distribution of light generated by one or more LEDs through a rod. More particularly, the invention relates to a white light emitting rod including paint distributed in such a way as to both control the angular distribution of light leaving the rod, and to ensure uniform light distribution along the length of the rod.

Recent side emitting rods, such as in U.S. Pat. No. 4,733,332, issued to Agency of Industrial Science and Technology and Daikin Industries, Ltd. and herein incorporated by reference, have used optical facets or fine powder down one side of the rod. These facets or powders serve to outcouple light from the rod in a direction opposite to the facets, and with a relatively narrow angular distribution. These rods are potentially expensive to make, and do not perform well for white light generated by mixing of multi-colored LEDs, for example, red, green, and blue (RGB) LEDs.

A flexible rod material is used as an alternative outcoupling approach. This approach uses a narrow white strip embedded in a plastic material. Although this Lambertian scatter enhances the color of mixing of RGB white light, a uniform white stripe leads to a significant reduction in light intensity from one end of the rod to the other.

It would be desirable to uniformly distribute high quality LED-generated white light along the length of a rod, with a controllable angular distribution of light outside the rod. Additionally, it would be desirable that the efficiency with which light in the rod is coupled into the desired distribution is high (preferably at least 70%). It would also be desirable to produce these rods cost effectively.

SUMMARY OF THE INVENTION

According to the invention, a side-emitting illumination device for uniformly distributing light is composed of a light source, a light-transmitting rod which permits total internal reflection, and outcoupling material affixed to an outer surface of the rod. The light source, composed of one or more LEDs, passes light through the rod. As light is reflected off the inner surfaces of the rod, it impinges the outcoupling material which controls the angular distribution of light leaving the rod. This configuration ensures uniform light distribution along the length of the rod.

In various embodiments of the invention, the rod can be a flexible rod or a rigid rod. The rod can be shaped like an ellipse, a square, or have a combination of straight and curved edges in cross-section. The combination of straight and curved edges can vary in configuration along the length of the rod.

In other embodiments, the outcoupling material is white paint or fine white dots with varying packing density, distributed in such a way as to control the angular distribution of light leaving the rod. The white paint or fine white dots are distributed in such a way as to ensure uniform light distribution along the length of the rod.

In another embodiment the side-emitting illumination device includes a mirror at an end of the rod away from the light source to reflect light which reaches the end of the rod, increasing the outcoupling efficiency of the system.

The invention provides several advantages. The side-emitting illumination device allows for high quality white light distribution along the length of a rod, with a controllable angular distribution of light outside the rod. Additionally, the efficiency with which light in the rod is coupled into the desired distribution is high. Further, the heat generated by the light source is separate from the rod, and LED white light generated from red green and blue LEDs allows for changing color temperatures and adding dynamic color effects. Also, the size of the light engine system is smaller than currently required sources. Finally, the side-emitting illumination device can be produced cost effectively.

DETAILED DESCRIPTION OF THE PREFERRED EMBODIMENTS

Figure 1:
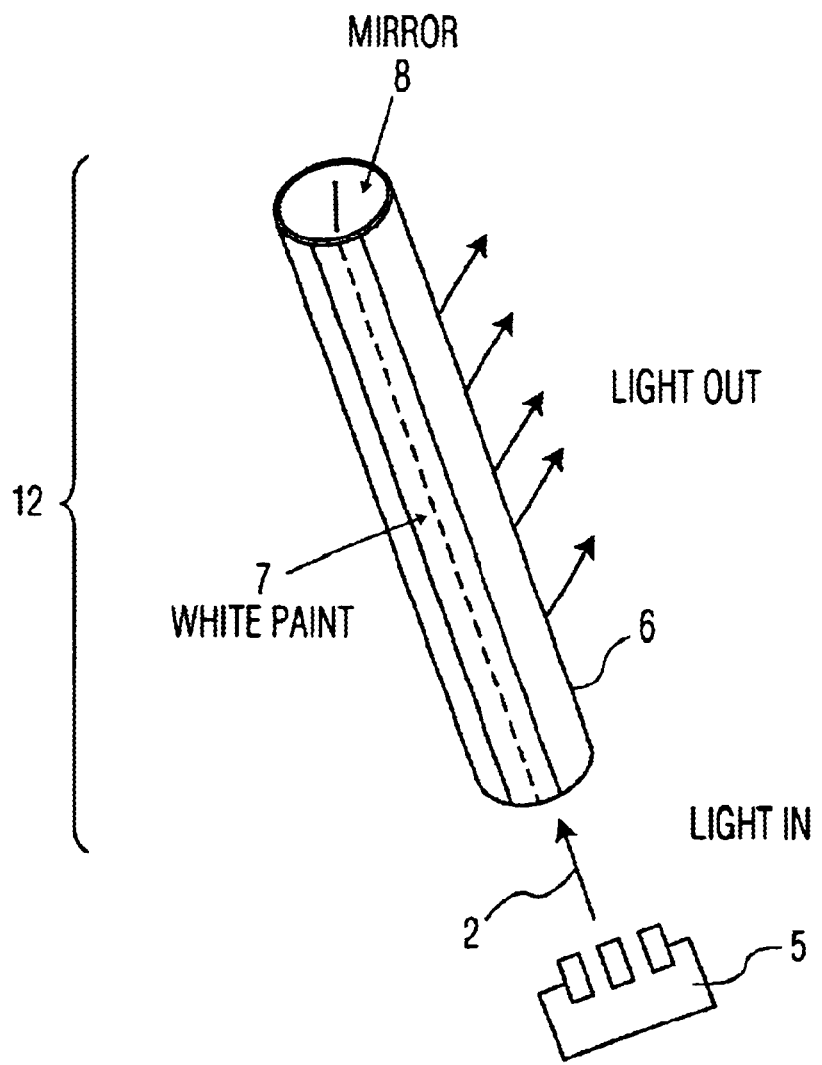
FIG. 1 side-emitting illumination device according to the invention.

Referring to FIG. 1, side-emitting illumination device 12 incorporates a RGB LED light source 5 which generates white light that enters rod 6 at one end. The white light travels through the rod 6 by total internal reflection (TIR). Rod 6 has a stripe of white paint 7 along its length. Light which hits the white paint is scattered and may no longer meet the TIR condition, which exists in the rod 6, and a portion of the light exits the side of rod 6.

In FIG. 1 a mirror 8 is placed at the end of rod 6 opposite the LED light source 5. This allows light that reaches the end of the rod 6 to be reflected and pass back down the length of the rod 6, increasing the outcoupling efficiency of the system. The outcoupling efficiency does depend, in part, on the input angular light distribution. Light traveling at a high angle to the optical axis of the rod is outcoupled more rapidly than light that is nearly parallel to the optical axis of the rod 6. The angular distribution of input light should be optimized for the system. Generally, it is better to have a distribution with low flux along the optical axis of the rod. This can be controlled by the arrangement of LEDs and optics inside the LED light engine used as a source 5 for the rod 6.

Figure 2A:
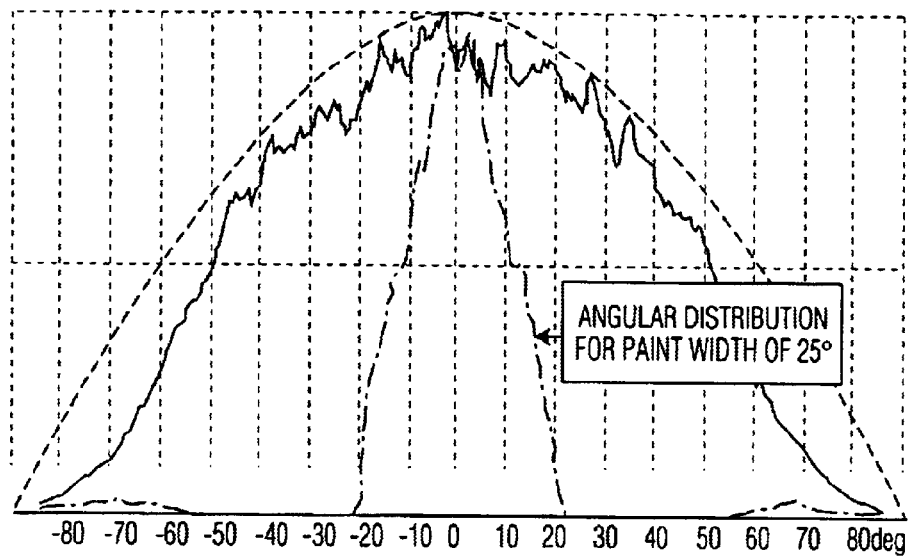
FIG. 2A is a graph showing the angular distribution of light determined by the width of the paint stripe of 25°.
Figure 2B:
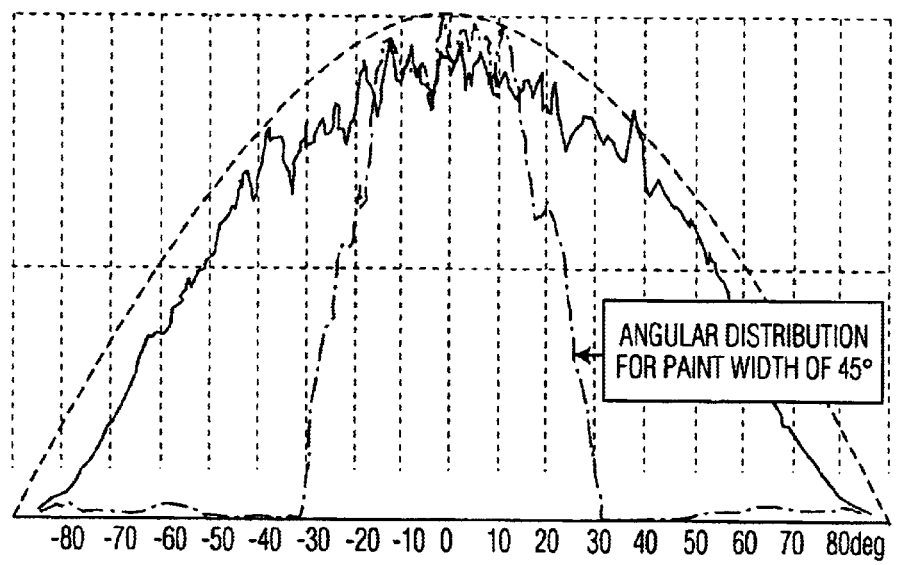
FIG. 2B is a graph showing the angular distribution of light determined by the width of the paint stripe of 45°.
Figure 3:
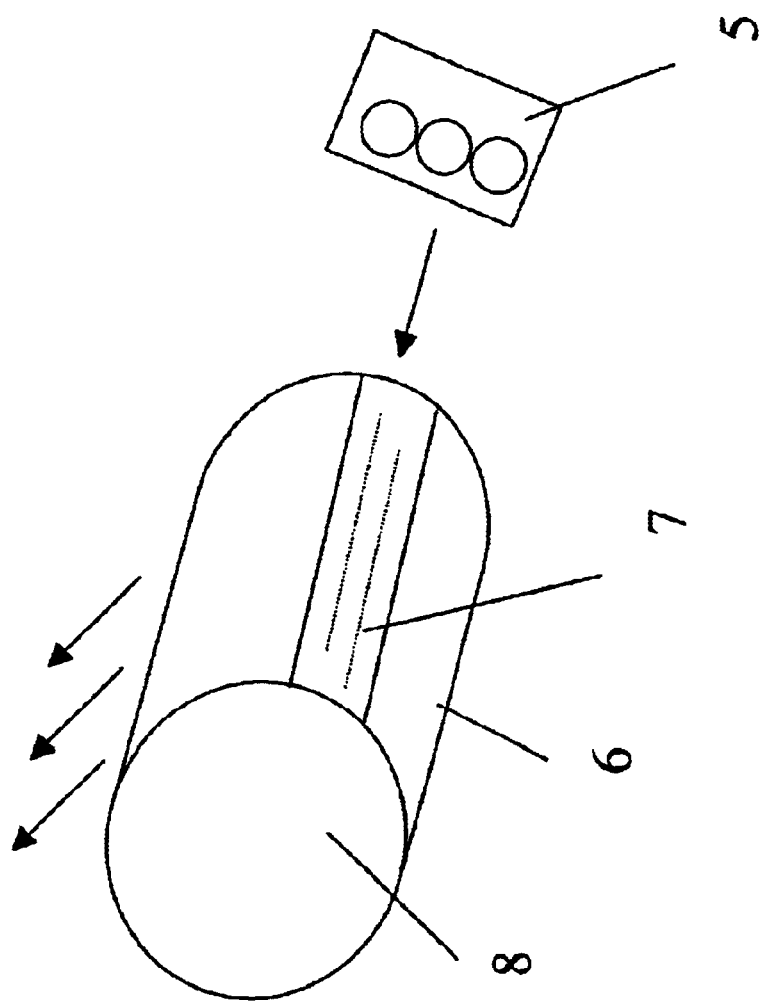
FIG. 3 depicts an elliptical rod with fine dots.
Figure 4:
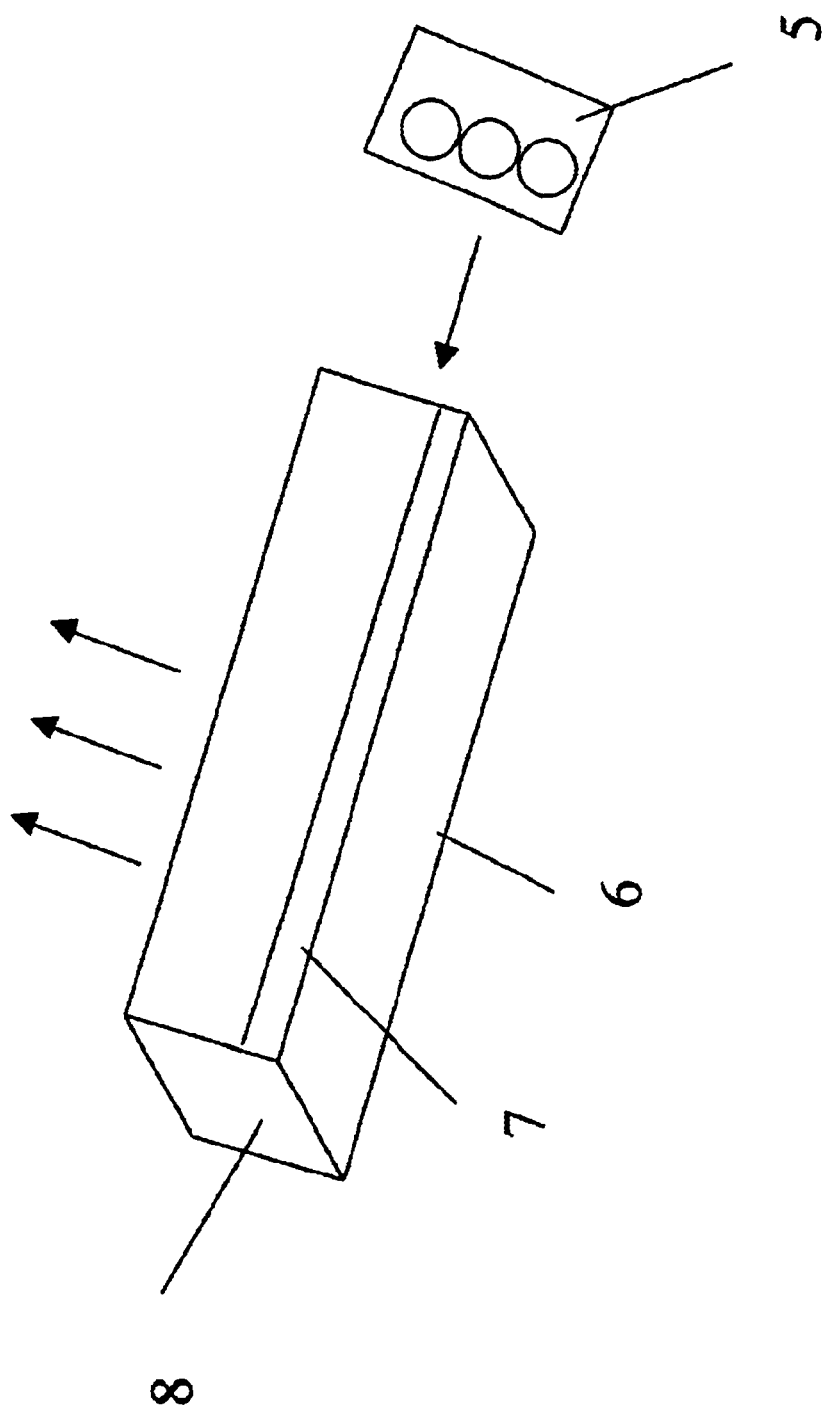
FIG. 4, depicts a square rod.
Figure 5:
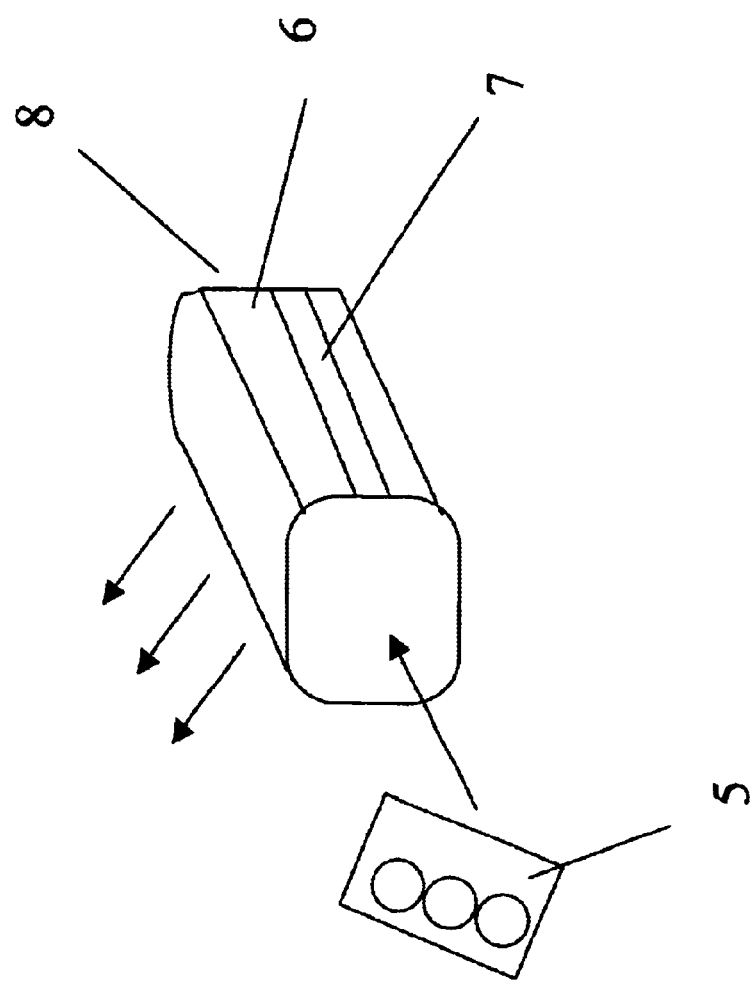
FIG. 5 depicts a rod made up of curved and straight edges.

The angular distribution of light (in the direction around the rod) is determined by the width of the paint stripe. Two examples of the distribution are shown in FIGS. 2A and 2B. Referring to FIG. 2A, the paint width is 25° (paint width is henceforth quoted as an angular width). Referring to FIG. 2B, the paint width is 45°. Broader output distribution results from increased angular width of the paint.

The calculations of angular width for FIGS. 2A and 2B are based on a round cross section rod. It is also possible to use other cross-sections. In particular, the cross-sections may be elliptical, square, or more generally, any combination of straight and curved edges, possibly varying in configuration along the length of the rod. These generalizations allow further control of the output angular distribution, permitting an inexpensive customization of distinct illumination products. It is also possible to vary the width of the paint stripe along the rod to gain still more control of the output angular distribution.

In many applications it is desirable to have the outcoupled light intensity uniform along the rod. This can be achieved by correctly varying the effective paint density along the rod 6. The paint density needs to be lower close to the light source than far away from the light source. This is easily achieved by replacing the solid stripe of paint with a series of stripes perpendicular to the length of rod 6, and varying the spacing between these small stripes and/or the width of these stripes (in the direction along the rod). Alternatively, the paint stripe can include fine white dots with varying packing density.

A potential application for the above-mentioned embodiments includes replacing lamps found in commercial supermarket freezers. The LED system provides a number of advantages recited above.

The preceding expressions and examples are exemplary and are not intended to limit the scope of the claims which follow.

What is claimed is:

1. A side-emitting illumination device for uniformly distributing light comprising:
   an LED light source,
   a light-transmitting rod which permits total internal reflection, and
   outcoupling material affixed to an outer surface of the rod, wherein the width of the outcoupling material affixed to an outer surface of the rod controls the angular distribution of light leaving the side of the rod.

2. The side-emitting illumination device of claim 1, wherein the light source further comprises a plurality of LEDs.

3. The side-emitting illumination device of claim 2, wherein the plurality of LEDs includes at least a red, a green, and a blue LED which, when mixed, generate white light.

4. The side-emitting illumination device of claim 3, wherein the array of red, green, and blue LEDs can be mixed to generate a variety of white light chromaticity.

5. The side-emitting illumination device of claim 2, wherein the array of red, green, and blue LEDs can be mixed to generate dynamic color effects.

6. The side-emitting illumination device of claim 2, wherein the rod is a flexible rod.

7. The side-emitting illumination device of claim 2, wherein the rod is a rigid rod.

8. The side-emitting illumination device of claim 2, wherein the outcoupling material is paint.

9. The side-emitting illumination device of claim 8, wherein the paint is white paint.

10. The side-emitting illumination device of claim 9, wherein the white paint is distributed in such a way as to control the angular distribution of light leaving the rod.

11. The side-emitting illumination device of claim 9, wherein the white paint is distributed in such a way as to ensure uniform light distribution along the length of the rod.

12. The side-emitting illumination device of claim 2, wherein the rod is an elliptical rod in cross-section.

13. The side-emitting illumination device of claim 2, wherein the rod is a square rod in cross-section.

14. The side-emitting illumination device of claim 2, wherein the rod is a combination of straight and curved edges in cross-section.

15. The side-emitting illumination device of claim 14, wherein the combination of straight and curved edges vary in configuration along the length of the rod.

16. The side-emitting illumination device of claim 2, wherein the outcoupling material comprises a combination of white paint and fine dots with varying packing density.

17. The side-emitting illumination device of claim 2, wherein the luminary further comprises a mirror at an end of the rod away from the light source.

18. The side-emitting illumination device of claim 17, wherein the mirror reflects light that travels the entire length of the rod.

19. A method of controlling the angular distribution of light leaving the side of a side-emitting illumination device for uniformly distributing light comprising:
   providing a light-transmitting rod which permits total internal reflection with an outcoupling material along its side;
   controlling the width of the outcoupling material to achieve a desired angular distribution of light leaving the side of the rod; and
   illuminating the light-transmitting rod with an LED light source.

* * * * *